March 18, 1941.    J. T. CRANDALL    2,235,737
WINDING MACHINE
Filed July 6, 1938
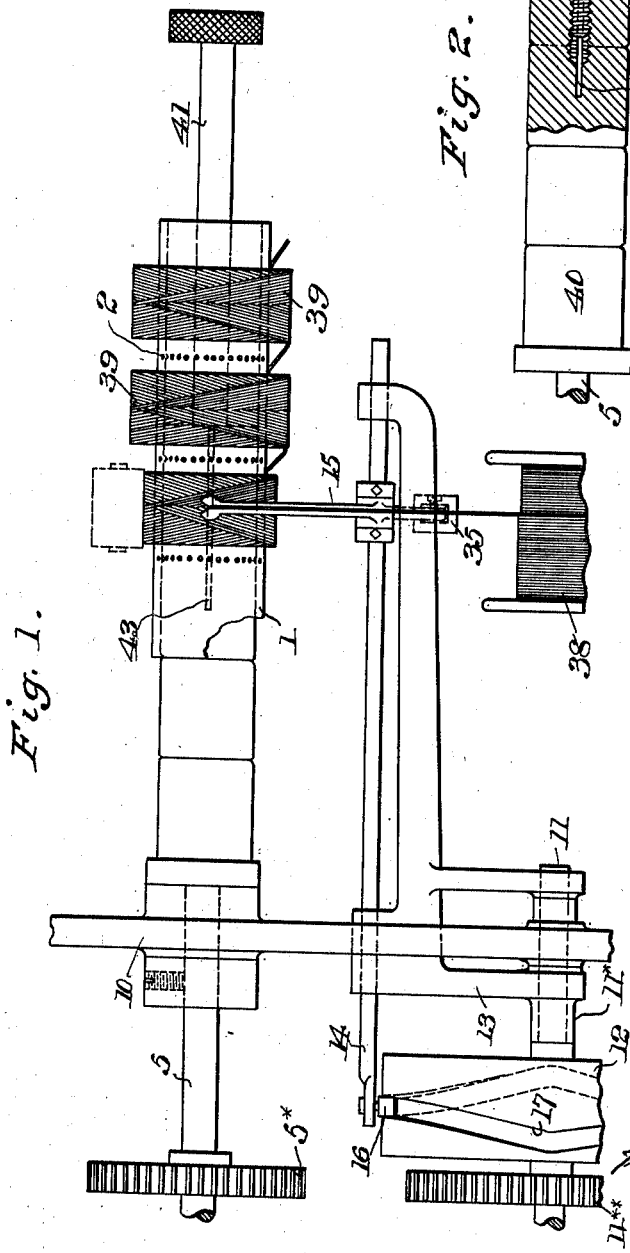
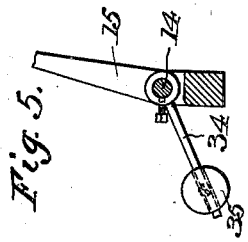
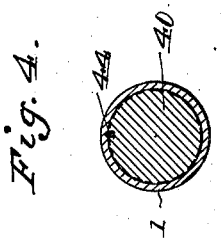
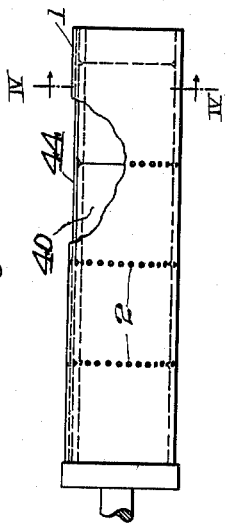
INVENTOR
Julian T. Crandall
BY
ATTORNEYS Patented Mar. 18, 1941

2,235,737

UNITED STATES PATENT OFFICE 2,235,737

WINDING MACHINE

Julian T. Crandall, Ashaway, R. I., assignor to Ashaway Line & Twine Manufacturing Company, Ashaway, R. I., a corporation of Rhode Island Application July 6, 1938, Serial No. 217,692

3 Claims. (Cl. 242—18)

The object of my invention is to provide a winding machine in which packages of fishline, twin, thread, ribbon, or the like may be progressively wound on adjacent core sections of a single core by means of a single guide carried by a traverse bar.

My invention comprises, generally, a rotary core support, a reciprocating traverse bar, a core adjustably held on said core support, as a tube circumferentially weakened at predetermined intervals, a guide on said traverse bar for use in winding successive packages, and a line supply, said guide being positioned to lead the line from the supply to successive core sections.

Practical embodiments of my invention are shown in the accompanying drawing, in which:

Fig. 1 represents a front elevation of so much of a winding machine as will give an understanding of my invention, in which manual means for presenting successive core sections in position for progressively winding packages thereon by the use of a single guide is shown;

Fig. 2 represents a detail front elevation, partly in section, of a means used to adjustably hold the core on the rotary core support;

Fig 3 represents a detail front elevation, partly broken away, of another means of holding the core on the rotary core support; and Fig. 4 represents a transverse vertical section of the core holding means shown in Fig. 3, taken on the line IV—IV of Fig. 3, looking in the direction of the arrows; and Fig. 5 is a fragmentary end elevation showing the counterbalance for the guide.

A hollow core 1, in the present instance a cylindrical tube being weakened circumferentially at predetermined intervals as by perforations 2, is adjustably held on a rotary core support as a spindle 40, said spindle being fixed on shaft 5. Tube 1 is removably and adjustably held on said support by manually operable means for presenting successive core sections of the same or different lengths in position for progressively winding packages thereon by the use of a single guide. Said means may comprise a spindle 40 adapted to be expanded at its outer end into contact with the inner surface of said tube 1 to hold the same thereon, as by forcing the tapered shoulder of screw 41 into the slot 42 of said spindle 40, which spindle is slit longitudinally at 43.

Shaft 5 is rotatably supported in frame 10 and may be driven by any well known or approved means, such as a gear 5\*.

Also rotatably supported in frame 10 is a shaft 11 on which a traverse cam 12 is mounted, said shaft 11 being driven in any well known or approved manner, as, for instance, by the gear 11\*\*.

A frame 13 is mounted on casing 11\* of shaft 11, said frame being adapted to slidably support and guide a traverse bar 14.

In the embodiment shown in Fig. 1, a guide 15 is carried by and swingably mounted on traverse bar 14, said traverse bar being actuated by the travel of a stud or roller 16 affixed thereto as said stud or roller travels in the endless groove 17 of traverse cam 12.

Frictional contact of the guide 15 with the respective packages is maintained by means of a tension device, in the present instance a weight 35 adjustably fixed on an arm 34 affixed at an angle to guide 15. The increase in diameter of the package causes the leverage on arm 34 to increase as weight 35 is caused to swing upwardly as the guide 15 is forced outwardly, thus constantly increasing the pressure of the guide on the package.

A single feed supply roll 38 is mounted in any well known or approved manner, and the line or other material is led therefrom to guide 15.

To produce a progressively wound separable multiple package unit according to Fig. 1, the operation is as follows:

The perforated tube 1 is slipped over spindle 40 until a section of the tube is in position for winding thereon when screw 41 is turned, thereby expanding the end of spindle 40 into contact with the inner surface of tube 1 by forcing the tapered shoulder of said screw into slot 42, said spindle being slit longitudinally at 43. The line or other material is then led from the supply roll 38 to and through guide 15, then to and around the desired core section of perforated core 1. Shafts 5 and 11 are then driven to rotate core 1 fixed on the tube support carried by shaft 5, and to actuate traverse bar 14 respectively, said traverse bar 14 being actuated by the travel of stud or roller 16, affixed thereto, in the endless groove 17 of traverse cam 12 which is fast on shaft 11.

The winding operation is continued until a package containing a desired length of line or other material is completed, as 39. Then the screw 41 is loosened to allow the core 1 to be slid along the spindle until the next succeeding core section is in position for winding a package thereon when the screw 41 may be again tightened.

When the form shown in Figs. 3 and 4 is used the core is slid on over spindle 40, which carries a longitudinally disposed blade 44 adapted to engage the inner surface of core 1 to hold the core thereon. Longitudinal adjustment of the core in this instance is obtained by pushing or pulling the core to slide it along the spindle. The winding operation is similar to that described above for the form shown in Fig. 1.

This operation is repeated until the desired number of packages have been progressively wound when they may be removed as a unit.

It is evident that various changes may be made in the construction, form and arrangement of the several parts without departing from the spirit and scope of my invention and, hence, I do not intend to limit myself to the particular embodiments herein shown and described.

What I claim is:

1. In a winding machine, a rotary core support, a reciprocating traverse bar, a sectional core, only manually adjustable along said core support for presenting successive sections of the same or different lengths in position to be wound, a line guide on said traverse bar and a line supply, said guide being positioned to lead the line from the supply to successive core sections.

2. In a winding machine, a rotary core support, a reciprocating traverse bar, a sectional core, only manually adjustable along said core support for presenting successive sections of the same or different lengths in position to be wound, a line guide on said traverse bar and a line supply, said guide being positioned to lead the line from the supply to successive core sections, and means for holding the guide in yielding frictional contact with the package during the winding thereof.

3. In a winding machine, a rotary core support, a reciprocating traverse bar, a sectional core, only manually adjustable along said core support for presenting successive core sections of the same or different lengths in position to be wound, a line supply, and means mounted on the traverse bar to lead the line from the supply to successive core sections of the same or different lengths.

JULIAN T. CRANDALL.